(No Model.) 2 Sheets—Sheet 1.
M. F. HORINE.
APPARATUS FOR MAKING SCALE RECORDS AND CERTIFICATES.
No. 556,009. Patented Mar. 10, 1896.
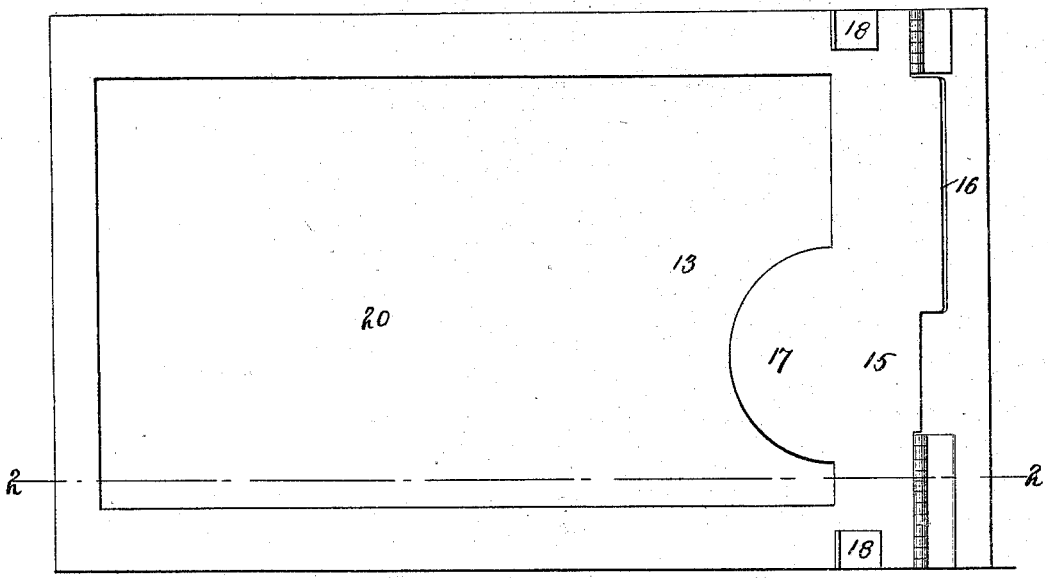
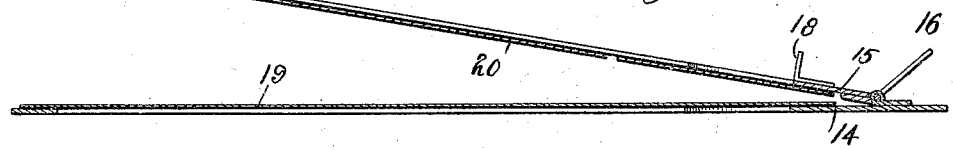
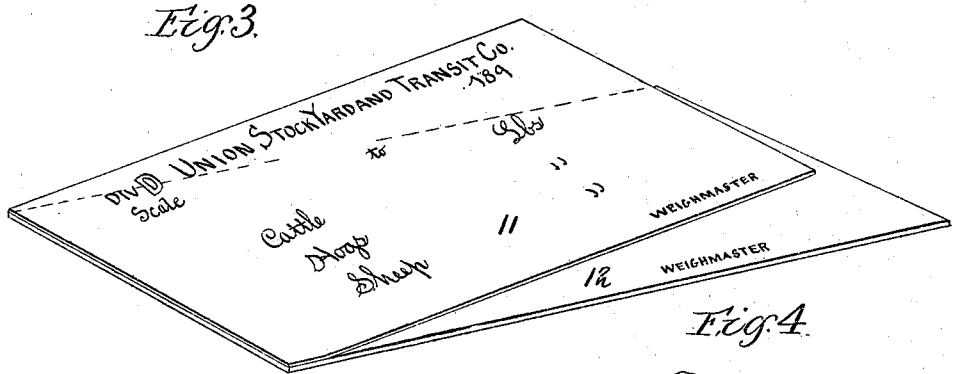
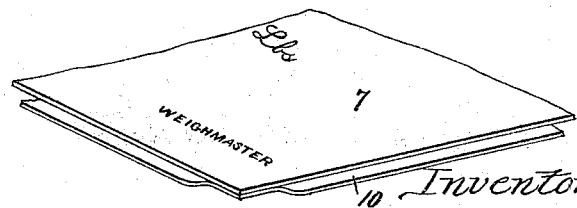

(No Model.) 2 Sheets—Sheet 2.
M. F. HORINE.
APPARATUS FOR MAKING SCALE RECORDS AND CERTIFICATES.
No. 556,009. Patented Mar. 10, 1896.
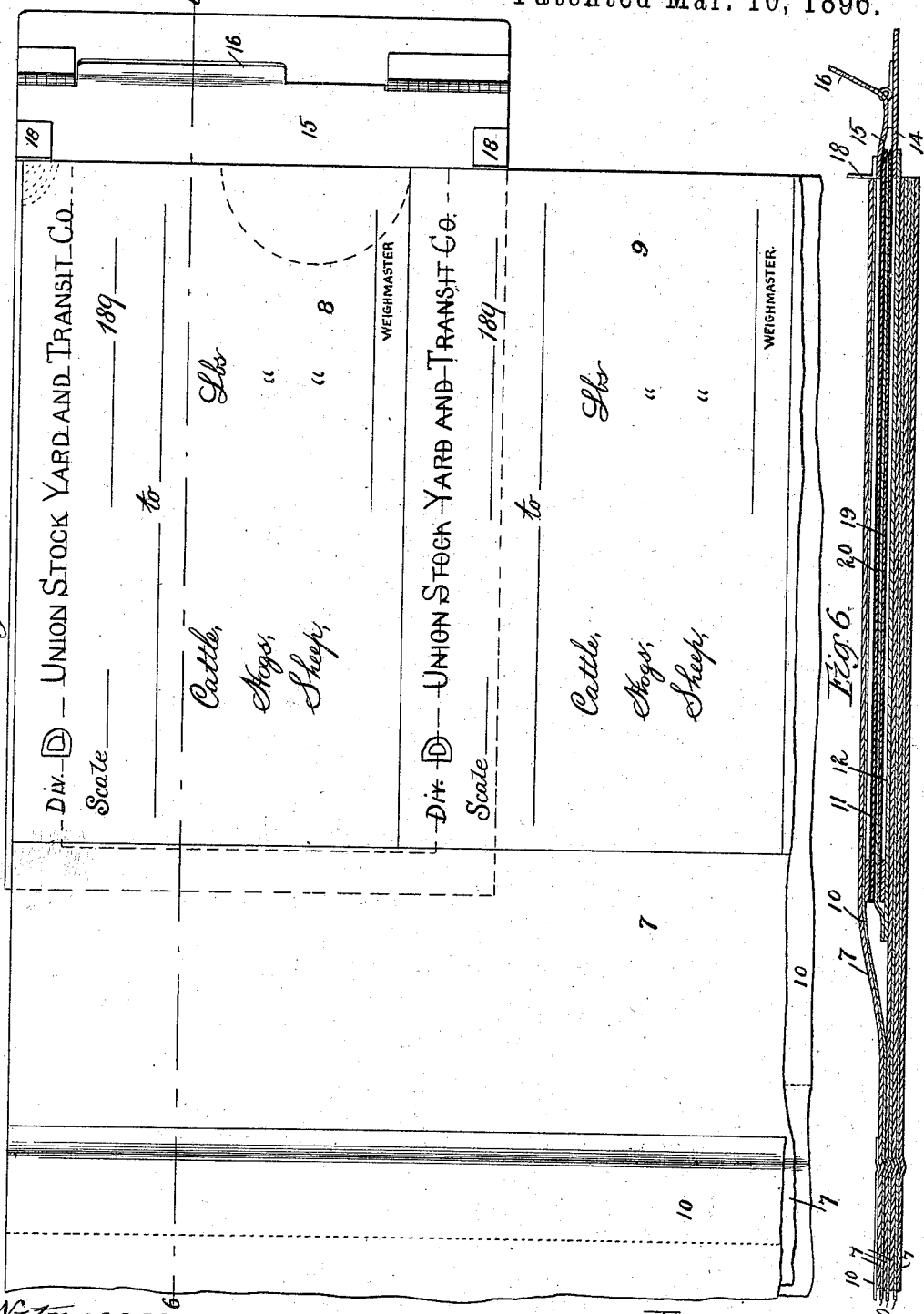
Witnesses
Inventor
Melville F. Horine,

UNITED STATES PATENT OFFICE.

MELVILLE F. HORINE, OF CHICAGO, ILLINOIS.

APPARATUS FOR MAKING SCALE RECORDS AND CERTIFICATES.

SPECIFICATION forming part of Letters Patent No. 556,009, dated March 10, 1896.

Application filed December 10, 1895. Serial No. 571,691. (No model.)

*To all whom it may concern:*

Be it known that I, MELVILLE F. HORINE, a citizen of the United States, residing in Chicago, in the county of Cook and State of Illinois, have invented a certain new and Improved Apparatus for Making Scale Records and Certificates, of which the following is a specification, reference being had to the accompanying drawings, in which—

Figure 1 is a plan view of the carbon-frame. Fig. 2 is a section on line 2 2 of Fig. 1. Fig. 3 is a perspective view of one of the blanks. Fig. 4 is a perspective view showing a portion of the record-book. Fig. 5 is a plan view of the record-book showing the carbon-frame in use. Fig. 6 is a cross-section on line 6 6 of Fig. 5.

My invention relates to means for recording weights and other data used in the live-stock commission business.

The principal object of my invention is to simplify the labor of the weighmaster and to facilitate the transaction of the business of buying and selling cattle and other live stock. Another object is to provide an improved carbon-holding frame for use in making manifold copies, as will be hereinafter set forth.

To this end my invention consists in certain apparatus whereby the following records may be simultaneously produced: a permanent record showing the date of the sale, the scale, the names of the buyer and seller, and the number and weight of each draft of animals passed over such scale; also official fac-simile certificates of such record for the buyer and seller, and also a fac-simile reference-sheet for the use of the buyers' helpers at the scales.

My invention further consists in a carbon-holding frame by which manifold copies may be readily produced.

In the buying and selling and weighing of cattle and other live stock it is customary for the weighmaster to take his position at the scale-beam, and as the animals are driven upon the scales and weighed he makes out a record showing the number, weight, &c., of each draft of animals, and under the present practice it is necessary to afterward make several copies of such record for the use of the buyer and seller, thus making the work of the weighmaster's office exceedingly laborious besides delaying the weighing. It is also frequently necessary to consult the weighmaster's record-book for the purpose of supplying buyers' helpers and others with data for making up driving and shipping lists, confirming reports of sales, &c., and this still further interferes with the work of his office while increasing his liability to make errors. By my invention, however, I provide for the making of three fac-simile copies by the weighmaster at the time he enters his record in his permanent book, two of which copies are detached and are at once delivered to the seller, one being for his own use and the other for the use of the buyer. The third copy is detachable and is for the use of the buyer's helper at the scales, so that a separate file may be kept showing the weighmaster's records, which second record will be accessible at all times to any person who may wish to inspect it, thereby avoiding interference with the weighmaster's book.

The above is a general statement of the apparatus used, which will now be more particularly described, reference being had to the accompanying drawings.

7 indicates the leaves of a weighmaster's record-book, on the pages of which are two or more blank certificates 8 9, as indicated in the drawings, space being left for the insertion of the number of head and weight of the different animals, the number of the scale, the date, the names of the buyer and seller, and the weighmaster's signature.

At the back of each leaf 7 is a tissue or other suitable transparent sheet 10, the inner edge of which is bound in the book, its outer edge being free except at the corners, which are stuck to the leaf above it by some suitable adhesive material, the arrangement being such that the corners may be readily detached, freeing the tissue-sheet. Near their inner edges the tissue-sheets 10 are perforated, so that they may be readily detached, as indicated by dotted lines in Fig. 5.

11 12 indicate certificates which are secured together at the left-hand edge, the under certificate 12 being somewhat longer than the other, as shown in Fig. 3. The certificates 11 12 are printed in the same way as the certificates of the weighmaster's book, and they are of the same size as the blank certificates of such book. The certificate 11 is of paper sufficiently thin not to interfere with the manifolding, while the certificate 12 is of cardboard, the object of which will be explained hereinafter.

13 indicates a carbon-frame consisting of a stationary frame 14 rectangular in shape and open at the center.

15 indicates a movable frame which is hinged to the frame 14 and is provided with a thumb-piece 16 projecting at an angle thereto, as shown in Fig. 2. By means of the thumb-piece 16 the frame 15 may be raised or lowered, as desired. The two frames are adapted to fit one upon the other, the frame 15 being also open at the center. Each of the frames 14 15 has a semicircular projecting portion 17, as shown in Fig. 1.

18 indicates stops carried by the frame 15, the use of which will be hereinafter explained.

19 indicates a carbon-sheet which is secured upon the frame 14, said carbon-sheet being of the kind known as "semicarbon," having an impression-surface upon one face only. The carbon-sheet 19 is secured upon the frame 14 with its carbon face down.

20 indicates a double carbon-sheet which is secured upon the under side of the frame 15, as shown in Fig. 2.

The use of my apparatus is as follows: The certificates 11 12 are fitted upon the frame 13, the frame 14 extending between the two certificates, the frame 15, however, resting upon the certificate 11. The certificate 12 is of such length that its free end projects beyond the carbon surface, so that the operator may grasp it, together with the frame 13, between his thumb and fingers and thus prevent the two certificates from becoming displaced. The semicircular portions 17 of the frame 13 protect the carbon-sheets from injury in handling. When the certificates 11 and 12 have been put in place upon the frame 13, said frame is inserted in the weighmaster's book in the manner indicated in Fig. 5, one of the leaves, 7, with its attached tissue-sheet resting upon the upper carbon surface. The stops 18 prevent the frame 13 from being inserted too far under the leaf and secure registration of the certificates, so that the weighmaster's writing will fill in the blanks at the proper places. The different parts of the apparatus being assembled, as described, the weighmaster notes the number of the scale, the date, and the names of the buyer and seller. He then indicates the number of head and the weight of the stock and signs the certificate. The result is that the upper carbon, 20, being double an impression is produced both on the tissue-sheet 10 and on the certificate 11, the lower carbon, 19, producing a fac-simile impression upon the cardboard certificate 12. The weighmaster then removes the frame 13 and delivers the certificates 11 12, still attached to each other, to the seller, who then submits them to the public inspector, as hereinafter described. The tissue-sheet remains attached to the leaf of the weighmaster's record-book until all the blanks on the leaf are filled, when it may be detached and placed on file for reference.

The object of making the certificate 12 of cardboard is that it permits the cattle-men to make any desired notes upon it while on horseback while at the stock-pens or other places where they have no access to a table or other writing-desk. This is highly important, as it is customary for the stockmen to make minutes of the terms of the sale and other important items immediately after the sale is consummated and the stock has been weighed. It is customary also for the public inspector to place his stamp upon the certificates or scale-tickets issued to the seller by the weighmaster, which, under the rules of the trade, are immediately submitted by the seller to the inspector, such inspector's stamp certifying as to the condition of the animals weighed.

In the use of my apparatus spaces are provided for the public inspector to stamp both the certificates 11 12, the certificate 11 being stamped on its face and the certificate 12 on its back, after which they are returned to the seller, who indorses upon the cardboard portion thereof the name of the owner, the price, and other data pertaining to rejected, crippled, or dead animals, &c., belonging to the same lot, and then sends them, still attached to each other, to his office. There the seller's clerk separates them and indorses the price and amount upon the certificate 11, which he delivers at once to the buyer's office, whose clerk makes it the basis of the buyer's accounts, while the seller's clerk retains the cardboard portion or certificate 12 as the basis of the seller's accounts. Thus, each promptly receives an official fac-simile certificate of the number, weight, and dockage of animals sold and weighed, in which the weights shown are copied directly from the scale-beam by the hand of the official weighmaster who did the weighing.

Neither buyer nor seller would ever think of sending to the scale record to verify the weights rendered them, as is now constantly done by the buyers under the old system, for under my system both would know that the figures shown on their respective certificates are identical with the record.

It will be seen that by the use of this apparatus the weighmaster at one writing produces four copies of the record of the weight, &c., of each draft of animals passed over the scales, one of such records being in his permanent record-book, the other three being separable for the use of the different parties in interest. In this way a vast amount of labor is avoided and the work is much more accurate as well, as all the copies must of necessity be alike. No transfers being made all discrepancies and transpositions are avoided, thus relieving the business of one of its greatest annoyances and a frequent source of loss.

So far as the carbon-frame is concerned, I wish it to be understood that it may be used in many other ways than that herein described, as it is adapted for the making of manifold copies for any desired purpose.

That which I claim as my invention, and desire to secure by Letters Patent, is—

1. In a record-book, the combination with the leaves of the book, of detachable tissue-sheets, said tissue-sheets being attached to said leaves so that they will turn with said leaves, substantially as described.

2. In a record-book, the combination with the leaves of the book, of detachable tissue-sheets, said tissue-sheets being attached at the corners to the backs of said leaves, substantially as described.

3. In a record-book, the combination with the leaves of the book, of detachable tissue-sheets, said tissue-sheets being bound in the book and being attached at the corners to said leaves, said tissue-sheets being also perforated.

4. A manifolding-frame comprising two or more pivotally-connected frames, said frames being open within their perimeter, substantially as and for the purpose specified.

5. A manifolding-frame comprising two or more pivotally-connected frames, said frames being open within their perimeter, and a projecting thumb-piece attached to one of said frames for separating said frames, substantially as and for the purpose specified.

6. A manifolding-frame comprising two or more pivotally-connected frames, said frames being open within their perimeter, and a stop to control the adjustment of said frames, substantially as described.

7. A manifolding-frame comprising two or more separable frames, said frames being open within their perimeter, and a projecting portion 17 on each of said frames, substantially as described.

8. In an apparatus for making scale records and certificates, the combination of the following elements: a book having leaves for receiving the record, tissue-sheets attached to said leaves, separate buyers' and sellers' certificate-blanks, and a manifolding-frame; all substantially as described and operating in the manner set forth.

MELVILLE F. HORINE.

Witnesses:
A. H. ADAMS,
HOLMES A. TILDEN.